(12) United States Patent
Kitai et al.

(10) Patent No.: US 6,733,406 B2
(45) Date of Patent: May 11, 2004

(54) VARIABLE-SPEED V-BELT DRIVE FOR VEHICLE

(75) Inventors: Haruo Kitai, Akashi (JP); Hiroyuki Fujimoto, Hyogo-ken (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 140 days.

(21) Appl. No.: 10/078,897

(22) Filed: Feb. 21, 2002

(65) Prior Publication Data
US 2002/0119846 A1 Aug. 29, 2002

(30) Foreign Application Priority Data
Feb. 23, 2001 (JP) ........................................ 2001-048518

(51) Int. Cl.[7] .......................... F16H 59/06; F16H 53/02; F16H 63/34
(52) U.S. Cl. ................................ 474/13; 474/19; 474/14
(58) Field of Search .............................. 474/13, 11, 19, 474/15, 14, 12, 37, 38, 43–45

(56) References Cited

FOREIGN PATENT DOCUMENTS

| DE | 2147640 A | * | 3/1973 | ............. F16H/9/12 |
|---|---|---|---|---|
| JP | 63-67453 A | * | 3/1984 | .................. 474/15 |
| JP | 59-170552 A | * | 9/1984 | .................. 474/13 |
| JP | 59-170554 | * | 9/1984 | .................. 474/13 |
| JP | A 11-173392 | | 6/1999 | |

* cited by examiner

Primary Examiner—Marcus Charles
(74) Attorney, Agent, or Firm—Oliff & Berridge, PLC

(57) ABSTRACT

A variable-speed V-belt drive includes: a drive pulley; a driven pulley including a fixed sheave with a cylindrical shaft and a movable sheave mounted on the cylindrical shaft so that the movable sheave can rotate and axially move; a V belt extended between the drive and driven pulleys; and a pressure mechanism of applying pressure to the movable sheave of the driven pulley. The pressure mechanism includes a helical cam groove formed in one of the cylindrical shaft and the movable sheave of the driven pulley, and a roller mounted on other of the cylindrical shaft and the movable sheave of the driven pulley so that the roller engages with the cam groove. The cam groove has opposite first and second working surfaces. The second working surface has a retaining surface of retaining the roller thereon when the vehicle travels in the engine-braking mode. The variable-speed V-belt drive can maintain the effect of engine brake at a high level even when traveling down a steep hill.

9 Claims, 9 Drawing Sheets

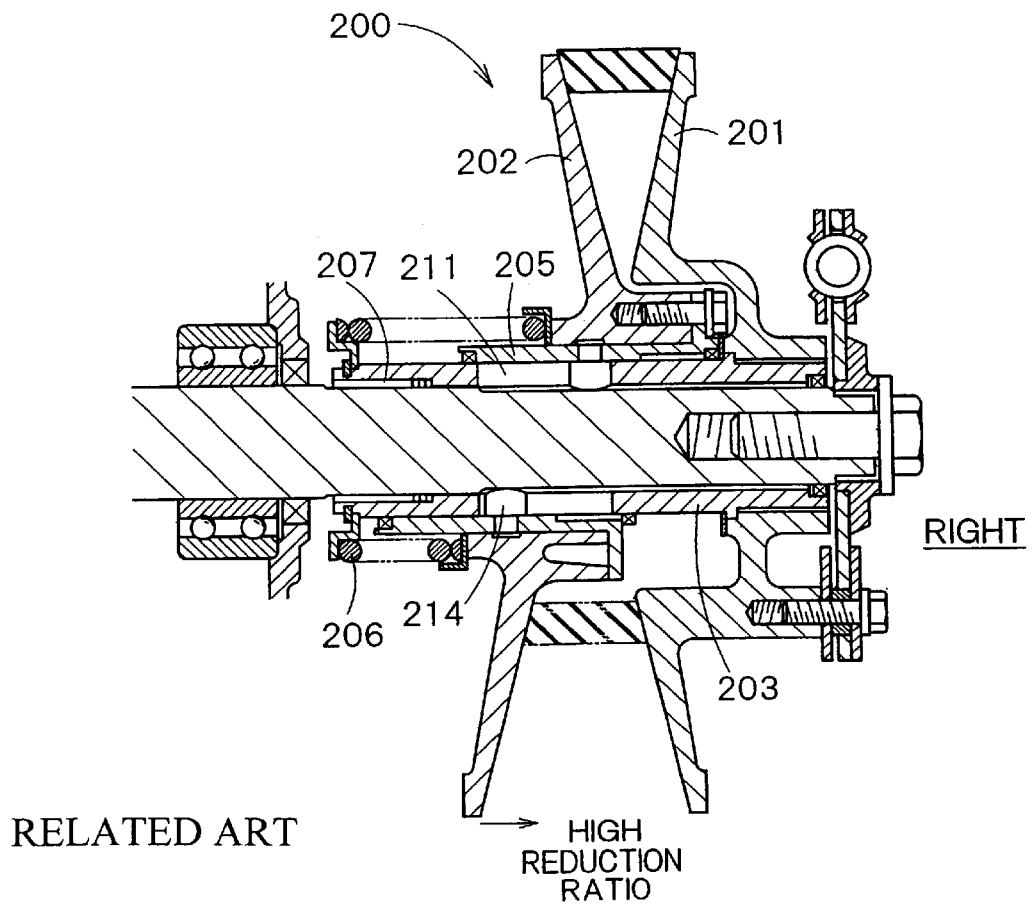
RELATED ART
FIG. 13
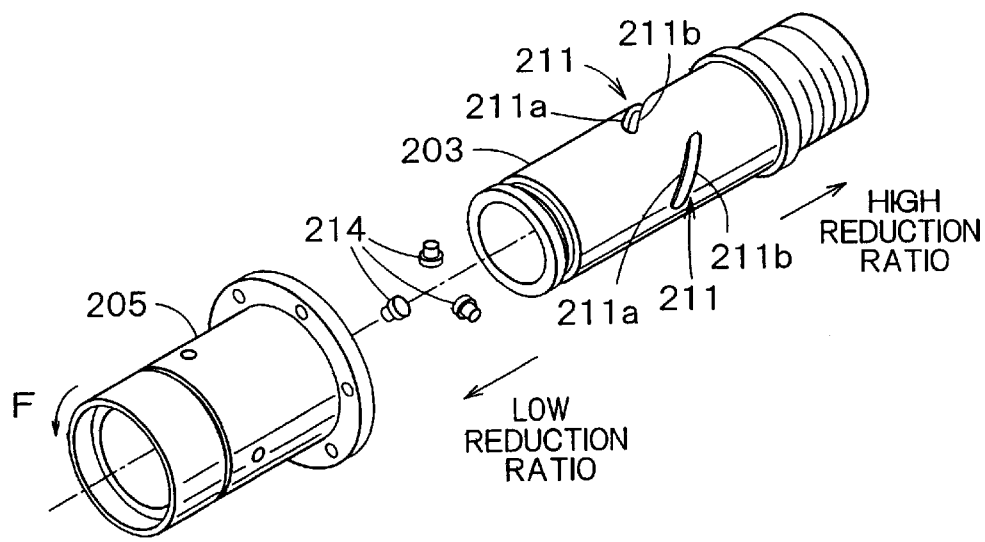
RELATED ART  FIG. 14

VARIABLE-SPEED V-BELT DRIVE FOR VEHICLE

BACKGROUND OF THE INVENTION

1. Field of the Invention

The present invention relates to a variable-speed V-belt drive for a vehicle with an engine.

2. Description of Related Art

Referring to FIG. 13 showing a related art of a variable-speed V-belt drive for a vehicle with an engine disclosed in JP-A 173392/1999, a driven pulley 200 has a fixed sheave 201 and a movable sheave 202, and a cylindrical cam shaft 203 having helical cam grooves 211. The cylindrical cam shaft 203 is formed integrally with the fixed sheave 201 of the driven pulley 200 and is fixedly mounted on a driven shaft 207. A sleeve 205 formed integrally with the movable sheave 202 is mounted on the cylindrical cam shaft 203 so that the sleeve 205 can axially move and rotate.

A pressure adjusting mechanism for the driven pulley 200 includes the cylindrical cam shaft 203, the sleeve 205, rollers 214 retained on the sleeve 205 and engaged in the cam grooves 211 of the cylindrical cam shaft 203, and pressure springs 206 biasing the movable sheave 202 toward the fixed sheave 201.

Referring to FIG. 14 showing the cylindrical cam shaft 203 and the sleeve 205 in an exploded perspective view, each cam groove 211 has a first working surface 211a and a second working surface 211b opposite and parallel to the first working surface 211a. The first working surface 211a, which is on the front side with respect to a rotating direction F, of each cam groove 211 engages with the roller 214 when the engine is operating in a driving mode. The second working surface 211b, which is on the rear side with respect to the rotating direction F, of each cam groove 211 engages with the roller 214 when the engine is operating in an engine-braking mode. The working surfaces 211a and 211b are smooth, continuous surfaces from one end of the cam groove 211 for a high reduction ratio to the other end of the same for a low reduction ratio to enable the rollers to move smoothly along the cam groove 211.

When the vehicle travels down a hill in an engine-braking mode, the movable sheave 202 of the driven pulley 200 is shifted to a position for a high reduction ratio by the pressure springs 206 and the each roller 214 is at a position near the position for a maximum reduction ratio in the cam groove 211 (FIG. 14) to set the variable V-belt drive at a high reduction ratio.

As shown in FIG. 14, the second working surface 211b of the cam groove 211, with which the roller 214 engages while the vehicle is traveling in the engine-braking mode, is parallel to the first working surface 211a and is a smooth, continuous surface. Therefore, it is possible that the roller 214 is forced to move from a position near the position for the maximum reduction ratio along the second working surface 211b toward a position for a low reduction ratio when the vehicle travels down a hill of a steep slop in the range of about 20° to about 30° and the rotative driving force of the rear wheels of the vehicle is very high. Consequently, the effective pitch diameter of the driven pulley 200 is decreased and the effect of engine brake is reduced.

SUMMARY OF THE INVENTION

Accordingly, it is an object of the present invention to provide a variable-speed V-belt drive for a vehicle with an engine, capable of maintaining a high engine-braking effect even while the vehicle is traveling down a hill, of enabling moderate shift from a normal engine-driving mode to an engine-braking mode without causing the vehicle to generate shocks when the vehicle starts traveling down a hill, and of enabling smooth shift from the engine-braking mode to the normal engine-driving mode.

According to a first aspect of the present invention, a variable-speed V-belt drive for a vehicle with an engine, comprises: a drive pulley mounted on a drive shaft; a thrusting mechanism mounted on the drive shaft and capable of exerting thrust to the drive pulley to vary effective pitch diameter of the drive pulley; a driven pulley mounted on a driven shaft, the driven pulley including a fixed sheave fixedly mounted on the driven shaft and a movable sheave, the fixed sheave being integrally provided with a cylindrical shaft, the movable sheave being mounted on the cylindrical shaft so that the movable sheave can rotate and axially move on the cylindrical shaft; a V belt extended between the drive pulley and the driven pulley; and a pressure mechanism of applying pressure to the movable sheave of the driven pulley, the pressure mechanism including a helical cam groove formed in one of the cylindrical shaft and the movable sheave of the driven pulley, and a roller mounted on other of the cylindrical shaft and the movable sheave of the driven pulley so that the roller engages with the cam groove, the cam groove having opposite side surfaces respectively serving as a first working surface with which the roller engages when the vehicle travels in an engine-driving mode and a second working surface with which the roller engages when the vehicle travels in an engine-braking mode, the second working surface of the cam groove having a retaining surface of retaining the roller thereon when the vehicle travels in the engine-braking mode.

Even when the vehicle travels down a hill in the engine-braking mode and the rotative driving force of the rear wheels of the vehicle increases, the roller is retained on the retaining surface of the second working surface of the cam groove to maintain the variable-speed V-belt drive at a fixed reduction ratio. Consequently, the high effect of engine brake can be maintained.

Preferably, the retaining surface is formed so that the roller is retained at a position displaced from a position for a maximum reduction ratio toward a position for a low reduction ratio.

Thus, the engine-driving mode is changed moderately to the engine-braking mode when the vehicle starts traveling down a hill.

Preferably, the second working surface is provided with a recess involving the retaining surface and having a depth equal to about half a diameter of the roller.

Thus, the recess involving the retaining surface retains the roller therein to maintain the effect of engine-braking, and enables the roller to move out of the recess smoothly when the traveling mode of the vehicle changes from the engine-braking mode to the engine-driving mode to ensure smooth change from the engine-braking mode to the engine-driving mode.

Preferably, the recess involves the retaining surface and a guide surface, the guide surface extending from the retaining surface and smoothly merging into an end surface of the cam groove on a side of the position for the maximum reduction ratio.

Thus, the traveling mode of the vehicle can be smoothly changed from the engine-driving mode to the engine-braking mode when the vehicle starts traveling down a hill.

According to a second aspect of the present invention, a variable-speed V-belt drive for a vehicle with an engine, comprises: a drive pulley mounted on a drive shaft; a thrusting mechanism mounted on the drive shaft and capable of exerting thrust to the drive pulley to vary effective pitch diameter of the drive pulley; a driven pulley mounted on a driven shaft, the driven pulley including a fixed sheave fixedly mounted on the driven shaft and a movable sheave, the fixed sheave being integrally provided with a cylindrical shaft, the movable sheave being mounted on the cylindrical shaft so that the movable sheave can rotate and axially move on the cylindrical shaft; a V belt extended between the drive pulley and the driven pulley; and a pressure mechanism of applying pressure to the movable sheave of the driven pulley, the pressure mechanism including a helical cam groove formed in one of the cylindrical shaft and the movable sheave of the driven pulley, and a roller mounted on other of the cylindrical shaft and the movable sheave of the driven pulley so that the roller engages with the cam groove, the cam groove having opposite side surfaces respectively serving as a first working surface with which the roller engages when the vehicle travels in an engine-driving mode and a second working surface with which the roller engages when the vehicle travels in an engine-braking mode, the second working surface of the cam groove including a segment having a large lead angle which is larger than a lead angle of the first working surface.

Even when the vehicle travels down a hill in the engine-braking mode and the rotative driving force of the rear wheels of the vehicle increases, the section having a large lead angle restrains the roller from moving toward a position for a low reduction ratio, prevents excessively high effect of engine braking, and prevents the reduction of the effect of engine brake moderately.

Preferably, the segment having the large lead angle extends from a position, which is axially displaced from a position for a maximum reduction ratio in the cam groove toward a position for a low reduction ratio, toward the position for the low reduction ratio.

Thus, the sharp increase of the effect of engine brake can be prevented.

Preferably, the segment having the large lead angle extends from a position, which axially coincides with a position for a maximum reduction ratio in the cam groove, toward a position for a low reduction ratios.

Thus, the reduction of the effect of engine brake can be prevented and engine brake becomes effective quickly.

BRIEF DESCRIPTION OF THE DRAWINGS

The above and other objects, features and advantages of the present invention will become more apparent form the following description taken in connection with the accompanying drawings, in which:

FIG. 13 is a sectional view of a driven pulley included in a related art of a variable-speed V-belt drive; and FIG. 14 is an exploded perspective view of a sleeve and a cylindrical cam shaft included in a driven pulley of a related art of the variable-speed V-belt drive.

DESCRIPTION OF THE PREFERRED EMBODIMENTS

Figure 1:
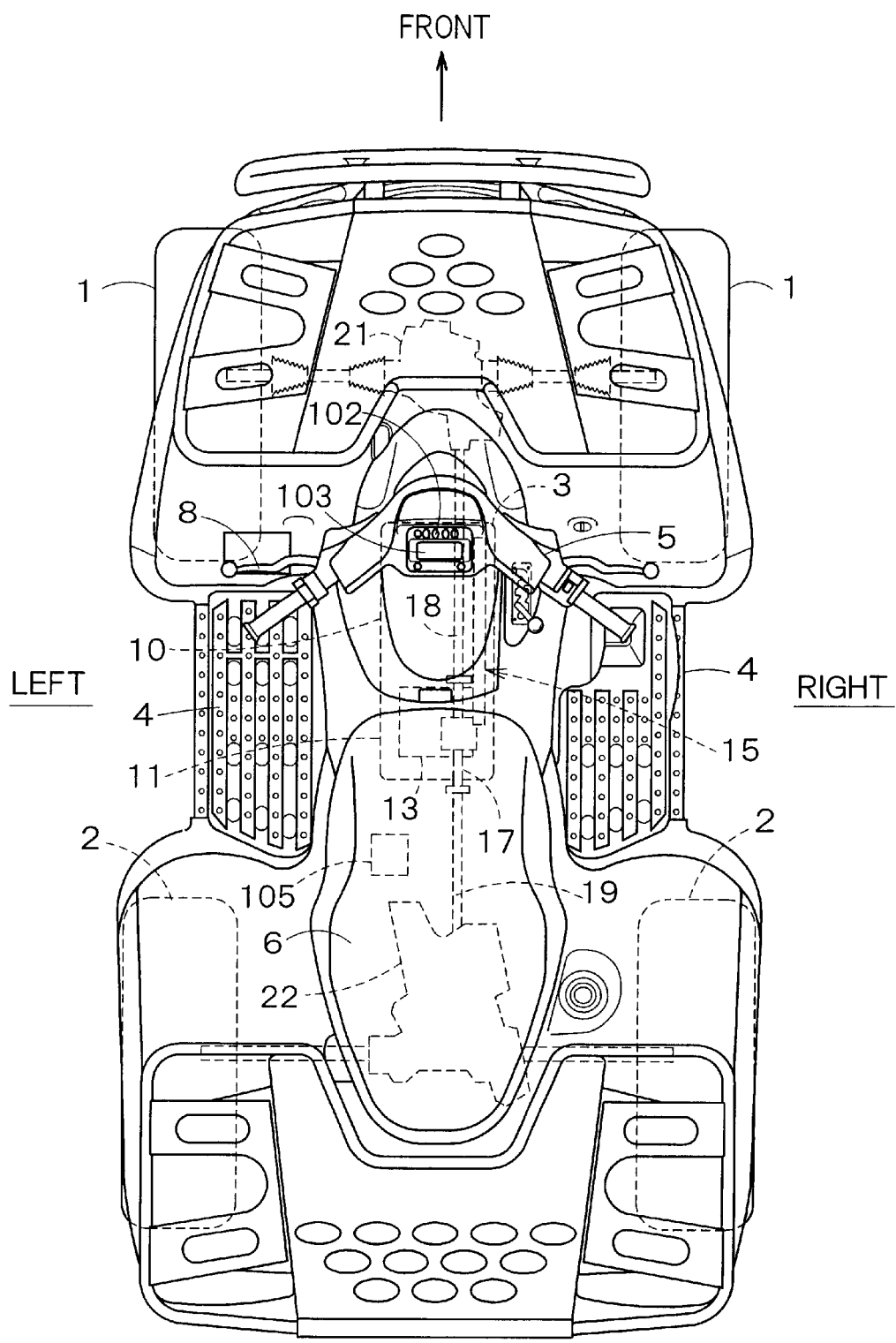
FIG. 1 is a plan view of a four-wheeled all-terrain vehicle provided with a variable-speed V-belt drive in an embodiment according to the present invention is applied.

FIG. 1 is a plan view of a straddle type four-wheeled all-terrain vehicle provided with a variable-speed V-belt drive in an embodiment of the present invention. In the following description words, "right", "left", "front" and "rear" and the like words signify positional and directional attributes with respect to the direction of forward travel of the all-terrain vehicle.

Referring to FIG. 1, showing the straddle-type four-wheeled all-terrain vehicle, right and left front wheels 1 are suspended from a front part of a body frame, right and left rear wheels 2 are suspended from a rear part of the body frame, and an engine 3 having a crankcase 10 is mounted in a middle part of the body frame. Steps 4 are disposed on the right and the left side of the engine 3. A handlebar 5 is supported on an upper part of the body frame, and a straddle-type seat 6 is disposed behind the handlebar 5. A handgrip is put on one end of the handlebar 5, and operating levers including a brake lever 8 are arranged around the handgrip. Meters including a speed meter 103, and pilot lamps 102 including a two-wheel drive mode indicating lamp and a four-wheel drive indicating lamp are arranged in a middle part of the handlebar 5. The crankcase 10 of the engine 3 extends rearward, and a transmission case 11 is integrally formed at the rear end of the crankcase 10. A gear type transmission 13 is built in the transmission case 11.

A variable-speed V-belt drive 15 in an embodiment according to the present invention is joined to the right side surface of the crankcase 10. Power of the engine 3 is transmitted through the variable-speed V-belt drive 15 to the gear type transmission 13.

A drive shaft 17 is extended back-and-forth under the transmission case 11. A front propeller shaft 18 for driving the front wheels 1, and a rear propeller shaft 19 for driving the rear wheels 2 are connected to the front end and the rear end, respectively, of the drive shaft 17. The front end of the front propeller shaft 18 is connected to a gear mechanism held in a front reduction gear case 21, and the rear end of the rear propeller shaft 19 is connected to a gear mechanism held in a rear reduction gear case 22.

Figure 2:
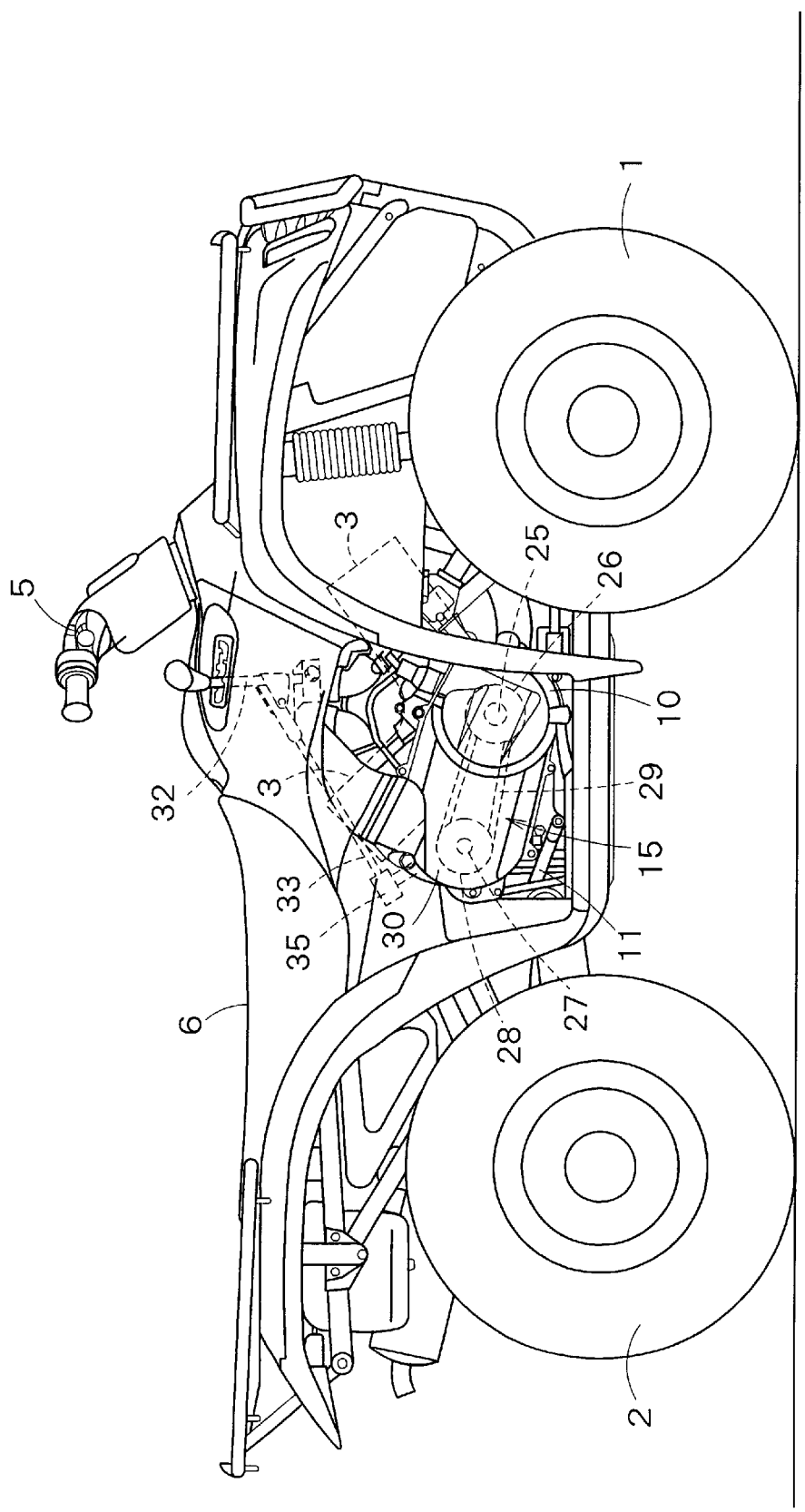
FIG. 2 is a side elevation of the four-wheeled all-terrain vehicle shown in FIG. 1.

As shown in FIG. 2, the engine 3 is a two-cylinder v-engine. The variable-speed V-belt drive 15 includes a front drive pulley 26, a rear driven pulley 28, and a V belt 29 extended between the pulleys 26 and 28. The variable-speed V-belt drive 15 is covered with a V-belt drive cover 30.

A shift lever 32 is disposed below the right end of the handlebar 5 and is interlocked with an outside change lever 35 disposed in an upper end part of the transmission case 11 by a connecting rod 33.

[Variable-speed V-belt Drive]

(Drive Pulley)

Figure 3:
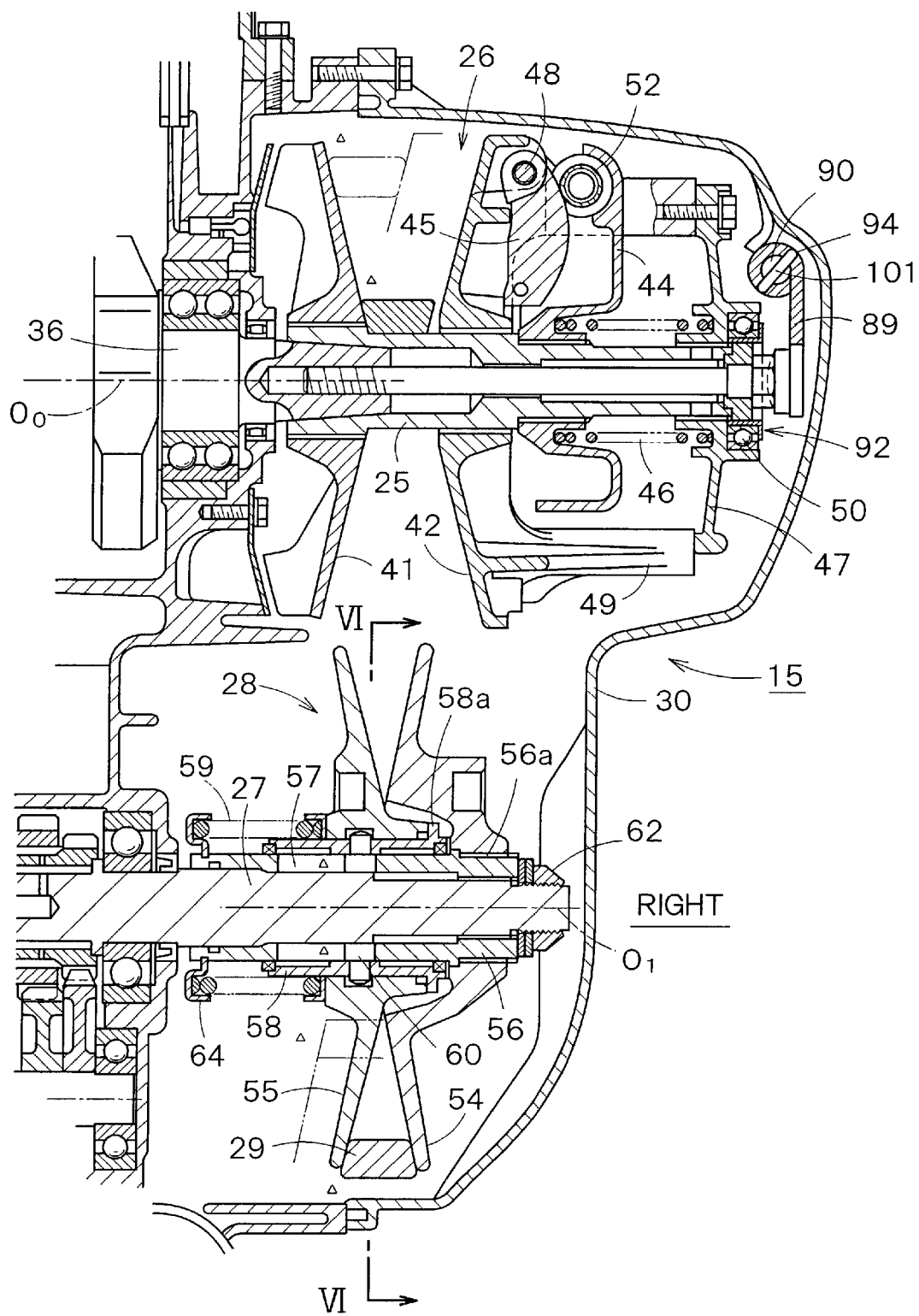
FIG. 3 is an enlarged sectional view of a variable-speed V-belt drive of an embodiment according to the present invention, as taken in planes each including each of axes of the variable-speed V-belt drive.

Referring to FIG. 3 showing the variable-speed V-belt drive 15 in a sectional view, a drive shaft 25 is connected to a right end part of a crankshaft 36 coaxially. The drive pulley 26 includes a fixed sheave 41 and a movable sheave 42. The fixed sheave 41 is fixedly mounted on the drive shaft 25 so that the fixed sheave 41 cannot axially move nor rotate. The movable sheave 42 is slidably mounted on the drive shaft 25 so that the movable sheave 41 can axially move. The movable sheave 42 is connected via a spider 44 with the drive shaft 25 so that the movable sheave 42 can rotate together with the drive shaft 25.

A thrusting mechanism including the spider 44, a plurality of flyweights 45, a pressure spring 46, and a support plate 47 is disposed on the back side of the movable sheave 42. The flyweights 45 are supported pivotally by pins 48 on the back side of the movable sheave 42. As engine speed increases, the flyweights 45 turn away from the back surface of the movable sheave 42 on the pins 48. Connecting arms 49 extends to the right from the back surface of the movable sheave 42 through the spider 44, and the support plate 47 is fastened to the right ends of the connecting arms 49. The support plate 47 is mounted axially slidably on the drive shaft 25. A bearing 50 is fitted in a central boss formed on the support plate 47. A flanged collar 92 is fitted in the inner race of the bearing 50. An engine brake control lever 89 is in contact with the flange of the flanged collar 92. The flanged collar 92, the bearing 50, the support plate 47 and the connecting arms 49 move axially along the axis of the drive shaft 25 together with the movable sheave 42.

The spider 44 is disposed on the right side of the movable sheave 42 and is screwed on the drive shaft 25. The spider 44 is provided with pressure-receiving rollers 52 in contact with the flyweights 45, respectively. The pressure spring 46 is compressed between the spider 44 and the support plate 47 so as to bias the support plate 47 to the right to bias the movable sheave 42 to the right indirectly through the connecting arms 49. Thus, the pressure spring 46 biases the movable sheave 42 of the drive pulley 26 away from the fixed sheave 41 of the same. When the flyweights 45 turns as engine speed increases, the movable sheave 42 is moved to the left together with the support plate 47 against the resilience of the pressure spring 46 by reaction force acting on the pressure-receiving rollers 52 to compress the V belt 29 between the sheaves 41 and 42 of the drive pulley 26.

(Driven pulley)

The driven pulley 28 of the variable-speed V-belt drive 15 has a fixed sheave 54 fixedly mounted on a cylindrical cam shaft 56, and a movable sheave 55 disposed on the left side of the fixed sheave 54 axially opposite to the same. The cylindrical cam shaft 56 is fixedly mounted on a driven shaft 27 and is restrained from axial movement and rotation relative to the driven shaft 27. A nut 62 is screwed on a threaded end part of the driven shaft 27 to hold the cylindrical cam shaft 56 on the driven shaft 27. The fixed sheave 54 is screwed on a threaded right end part 56a of the cylindrical cam shaft 56. The fixed sheave 54 rotates together with the cylindrical cam shaft 56 and the driven shaft 27. The fixed sheave 54 is restrained from axial movement on the cylindrical cam shaft 56.

The movable sheave 55 is screwed on a sleeve 58. A pair of plain bearings are put on the cylindrical cam shaft 56. The sleeve 58 is supported on the plain bearings for rotation and axial movement relative to the cylindrical cam shaft 56. The movable sheave 55 is able to rotate and to move axially together with the sleeve 58.

A pressure regulating mechanism for the driven pulley 28 includes a spring retaining ring 64 retained on a left end of the cylindrical cam shaft 56, and a pressure spring 59 compressed between the spring retaining ring 56 and the movable sheave 55 to bias the movable sheave 55 to the right. Cam grooves 57 are formed in either the cylindrical cam shaft 56 as shown in FIG. 3 or the sleeve 58, and rollers 60 having a stepped shape are retained on either the sleeve 58 as shown in FIG. 3 or the cylindrical cam shaft 56. The rollers 60 engage with the cam grooves 57, respectively. Thus, the cylindrical cam shaft 56 with the cam grooves 57, the rollers 60 and the sleeve 58 holding the rollers 60 constitute a cam mechanism for helically moving the sleeve 58 relative to the cylindrical cam shaft 56.

Figure 5:
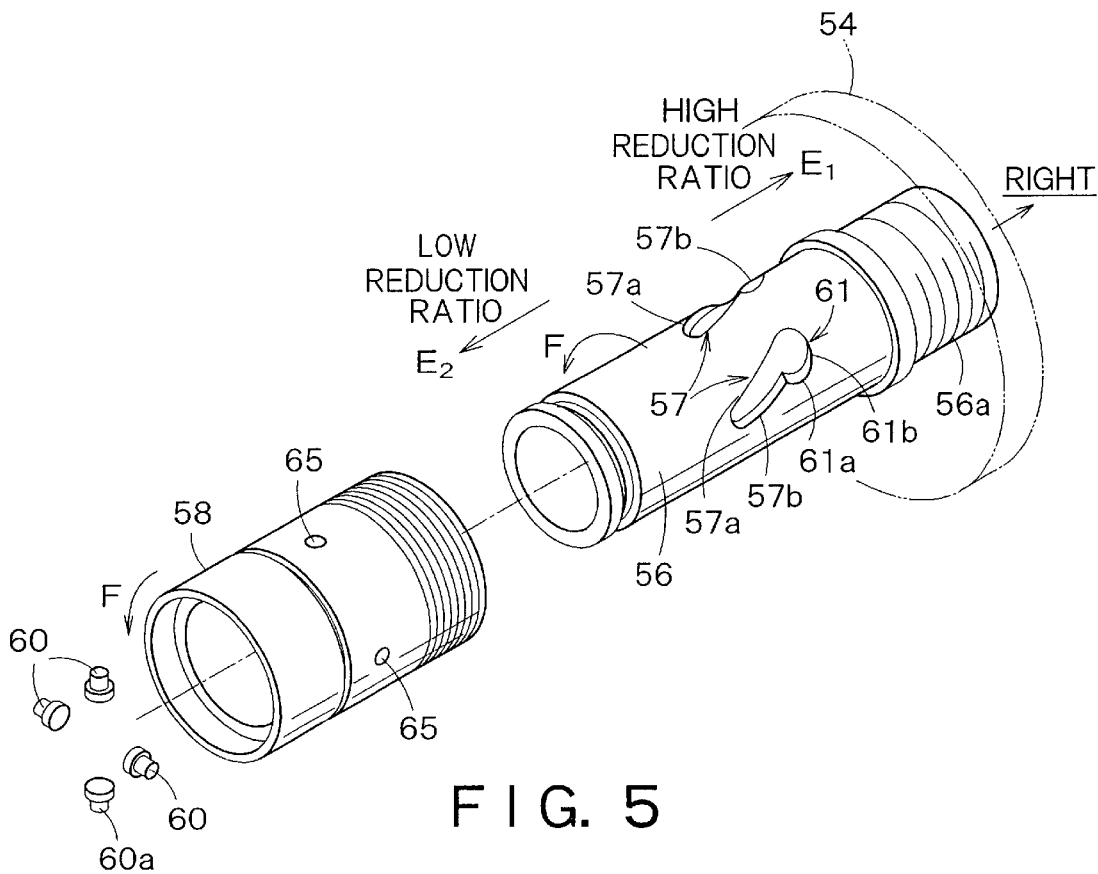
FIG. 5 is an exploded perspective view of a sleeve and a cylindrical cam shaft included in a driven pulley of the variable-speed V-belt drive shown in FIG. 3.

Referring to FIG. 5 showing the cylindrical cam shaft 56 and the sleeve 58 in an exploded perspective view, the sleeve 58 is provided with a plurality of radial through holes 65 arranged at equal angular intervals on a circle. Reduced parts 60a of the rollers 60 are fitted in the holes 65 from inside of the sleeve 58, respectively. Cam grooves 57 are formed in the cylindrical cam shaft 56 so that each cam groove 57 extends along a hypothetical helical line on the cylindrical cam shaft 56. Namely, a segment of the cam groove 57 nearer to the fixed sheave 54, i.e., a segment for higher reduction ratio, is displaced forward with respect to the rotating direction F of the cylindrical cam shaft 56 in comparison with the position of a segment of the cam groove 57 for lower reduction ratio. Each cam groove 57 has a front side surface 57a on the front side with respect to the rotating direction F, i.e., a first working surface 57a, and a back side surface 57b on the back side with respect to the rotating direction F, i.e., a second working surface 57b. When the all-terrain vehicle is traveling in the engine-driving mode, the roller 60 is pressed against the first working surface 57a. When the all-terrain vehicle is traveling in the engine-braking mode, the roller 60 is pressed against the second working surface 57b. A recess 61 involving a retaining surface 61a is formed in a segment of the second working surface 57b near one end of the cam groove 57 for a maximum reduction ratio.

Figure 6:
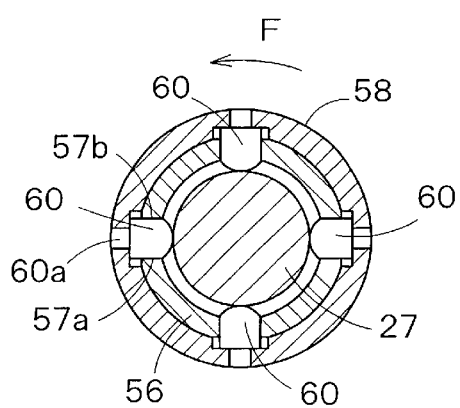
FIG. 6 is an enlarged sectional view taken on line VI—VI in FIG. 3.

As shown in FIG. 6, which is an enlarged sectional view taken on line VI—VI in FIG. 3, the four rollers 60 are arranged at equal angular intervals. The radially inner ends of the rollers 60 are in contact with the circumference of the driven shaft 27, so that the rollers 60 are retained on the sleeve 58.

Figure 7:
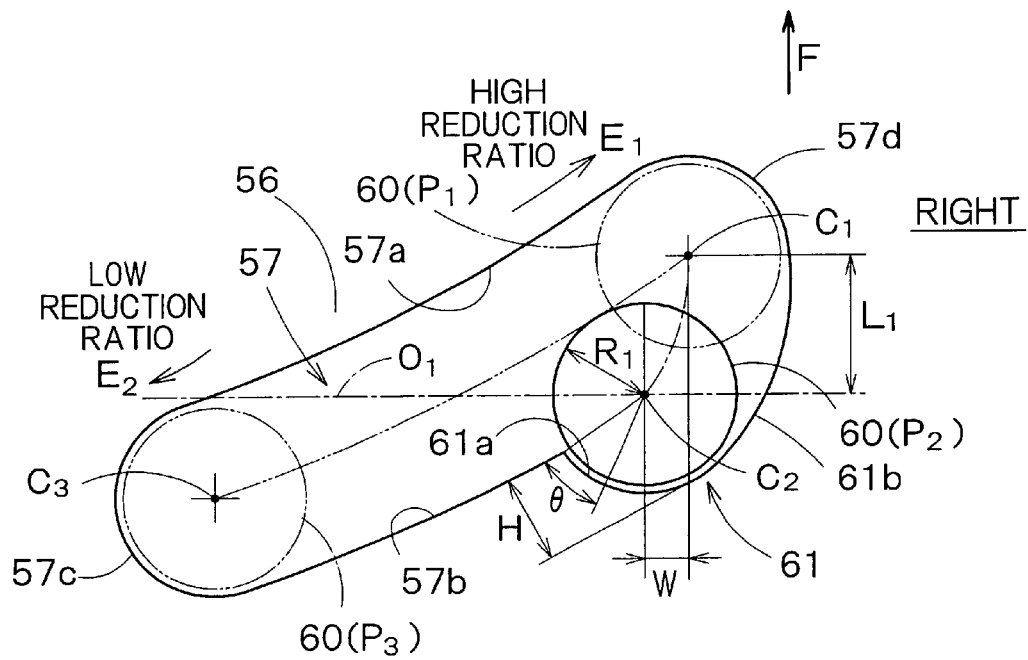
FIG. 7 is an enlarged development of a cam groove.

Referring to FIG. 7 showing the cam groove 57 in an enlarged development, left parts of the cam groove 57 are for lower reduction ratios (high-speed driving), and a right parts of the same are for higher reduction ratios (low-speed driving). A position P1 where the roller 60 is substantially in contact with the right end surface 57d, i.e., an end surface on the side for high reduction ratio, is a position of the roller 60 for the maximum reduction ratio. A reference character C1 indicates the position of the center of the roller 60 when the roller 60 is at the position P1. A position P3 where the roller 60 is substantially in contact with the left end surface 57c, i.e., an end surface on the side for lower reduction ratio, is a position of the roller 60 for the minimum reduction ratio. A reference character C3 indicates the position of the center of the roller 60 when the roller 60 is at the position P3.

The retaining surface 61a is formed at an end part on the side for low reduction ratios of the recess 61. The retaining surface 61a rises sharply from the second working surface 57b and has a shape of an arc of a circle of a radius slightly greater than the radius R1 of the roller 60. A segment of the retaining surface 61a corresponding to a circumferential segment of the roller 60 corresponding to a central angle θ in the range of 20° to 30° touches the roller 60 to retain the same thereon. The depth H of the recess 61 from the second working surface 57b is nearly equal to the radius R1 of the roller 60.

When the roller 60 is at a position P2 with its center at a position C2, the roller 60 is retained on the retaining surface 61a. The position C2 of the center of the roller 60 is behind the position C1 of the same when the roller 60 is at the position P1 for the maximum reduction ratio with respect to the rotating direction F by a predetermined circumferential distance L1 and is at a predetermined axial distance W from the position C1 toward the other end of the cam groove 57 for the minimum reduction ratio. The predetermined axial distance W is on the order of half the radius R1 of the roller 60, i.e., a distance in the range of about 5 to about 10 mm. The predetermined circumferential distance L1 is determined such that a time lag between a moment when engine brake is employed, i.e., a moment when the roller 60 starts from the position P1 for the maximum reduction ratio, and a moment when engine brake becomes effective, i.e., a moment when the roller 60 reaches the retaining position P2, is short enough to avoid giving an unpleasant feeling to the rider. For example, the predetermined circumferential distance L1 is equal to the circumferential length of an arc on the circumference of the cylindrical cam shaft 56 corresponding to a central angle about the axis of the cylindrical cam shaft in the range of about 18° to about 21°.

The recess 61 has a guide surface 61b extending from the retaining surface 61a toward the right end of the cam groove 57 for the maximum reduction ratio. The guide surface 61b has one end smoothly merging into the retaining surface 61a and the other end smoothly merging into an end surface 57d of the right end of the cam groove 57.

[Engine Brake Control Mechanism]

Figure 4:
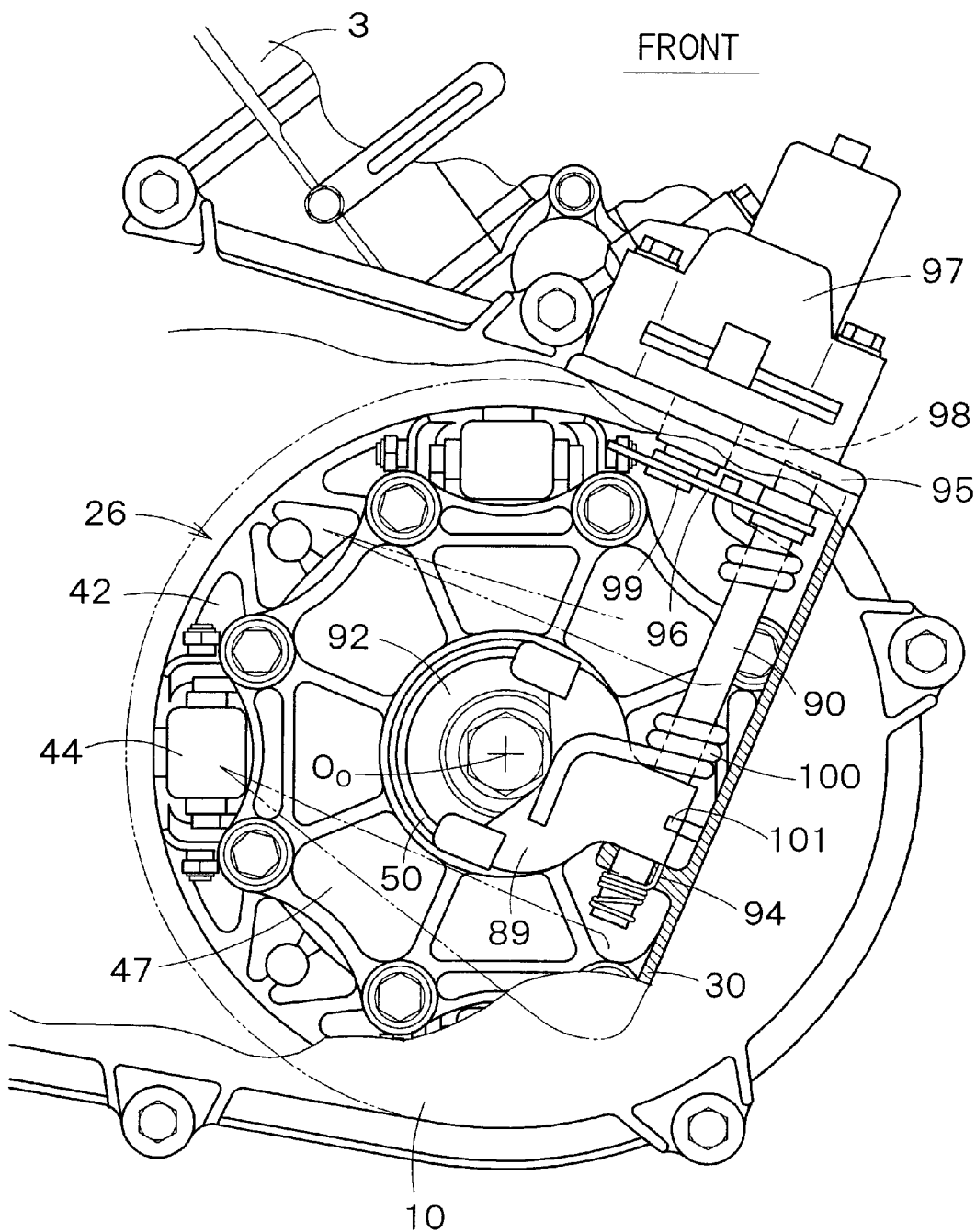
FIG. 4 is a side elevation of the variable-speed V-belt drive shown in FIG. 3, as viewed from the right side.

Referring to FIG. 3, the position of the movable sheave 42 of the drive pulley 26 farthest from the fixed sheave 41 can be adjusted by the engine brake control lever 89 to engage or disengage engine brake while the engine 3 is idling. As shown in FIG. 4, the engine brake control lever 89 is disposed on the right side of the support plate 47. The engine brake control lever 89 is supported on a shaft 90 and fixedly connected to the shaft 90 with a fixing pin 101. The shaft 90 is supported for turning on a protrusion 94 formed on the V-belt drive cover 30. A working end of the engine brake control lever 89 is disposed opposite to the flanged collar 92 fitted in the bearing 50 so as to be brought into contact with the flanged collar 92. When the engine brake control lever 89 is turned clockwise, as viewed in FIG. 3, to move the working end thereof toward the flanged collar 92 from an engine brake releasing position shown in FIG. 3, the farthest position of the movable sheave 42 is shifted to the left in order that engine brake is effective even while the engine 3 is idling.

Referring to FIG. 4 showing the right side of the drive pulley 26 and the associated parts, the working end of the engine brake control lever 89 bifurcated into two arms lying diametrically opposite to each other with respect to the axis $O_0$ of the drive shaft 25 (the axis of the crankshaft 36). The shaft 90 is on the front side of the axis $O_0$. The shaft 90 has a lower end supported for turning on the projection 94 of the V-belt drive cover 30 and an upper end supported for turning on a motor case 95. A link 96 has one end fixed to the upper end of the shaft 90 and the other end connected to an eccentric pin 99 fixed to a drive shaft 98 included in an electric motor 97. A torsion coil spring 100 is wound around a part of the shaft 90 between the engine brake control lever 89 and the link 96. The torsion coil spring 100 biases the engine brake control lever 89 toward the flanged collar 92 to prevent the free turning of the engine brake control lever 98 relative to the shaft 90 due to the loose fitting of the fixing pin 101 in holes formed in the engine brake control lever 89 and the shaft 90.

[Operation of Variable-Speed V-belt Drive]

Referring to FIG. 3, while the engine 3 is stopped, the flyweights 45 of the drive pulley 26 are inoperative, and the movable sheave 42 is biased to its right end position together with the support plate 47 by the pressure spring 46 and is held at the right end position by the pressure-receiving rollers 52. The movable sheave 55 of the driven pulley 28 is held at the position for the maximum reduction ratio by the pressure springs 59.

As engine speed increases after the engine 3 has been started, the flyweights 45 of the drive pulley 26 are turned by centrifugal force so as to shift the movable sheave 42 to the left. Consequently, the V belt 29 is compressed between the fixed sheave 41 and the movable sheave 42 of the drive pulley 26, and power is transmitted from the drive pulley 26 through the V belt 29 to the driven pulley 28. Then, power is transmitted from the driven shaft 27 to the input shaft of the gear type transmission 13.

[Engine-Driving Mode]

While the vehicle is traveling in the engine-driving mode, the movable sheave 42 of the drive pulley 26 moves axially according to the variation of engine speed or load on the engine 3, the movable sheave 55 of the driven pulley 28 is shifted axially according to the difference between pressure applied to the movable sheave 55 by the V belt 29 and pressure applied to the same by the pressure springs 59 for automatic speed change. If torque exerted on the driven pulley 28 increases and the movable sheave 55 is turned relative to the fixed sheave 54 in the rotating direction F, the sleeve 56 and the movable sheave 55 are moved toward the fixed sheave 54 because the rollers 60 are forced to move along the cam grooves 57. Consequently, pressure applied to the V belt 29 by the driven pulley 28 increases and the effective pitch diameter of the driven pulley 28 increases.

While the vehicle is traveling in the engine-driving mode, the rollers 60 are in contact with and move along the first working surfaces 57a of the cam grooves 57 and are scarcely in contact with the second working surfaces 57b of the cam grooves 57.

[Engine-braking Mode]

When the vehicle starts traveling forward down a hill with the engine speed maintained at an idling speed, the rollers 60 are at or near the position P1 for the maximum reduction ratio, and the traveling mode changes from the engine-driving mode to the engine-braking mode.

If the hill is a very steep and has a slope on the order of 30°, the driving force of the rear wheels 2 is very high and the movable sheave 55 of the driven pulley 28 starts moving axially away from the fixed sheave 54. In such a case, each of the rollers 60 located near the position P1 for the maximum reduction ratio (FIG. 7) moves along the guide surface 61b of the recess 61 toward a position for a low reduction ratio, the movement of roller 60 along the guide surface 61b is stopped by the retaining surface 61a and the roller 60 is retained at the retaining position P2. Consequently, the movable sheave 55 of the driven pulley 28 is restrained from movement away from the fixed sheave 54, and the desired effect of engine brake can be maintained.

The retaining position P2 where the roller 60 is retained is at the fixed axial distance W from the position P1 for the maximum reduction ratio toward a position for a low reduction ratio. Therefore, the engine brake becomes effective gradually and shocks that are generated when engine brake becomes effective can be reduced. The circumferential distance L1 is determined such that a time lag between a moment when engine brake is employed and each roller 60 starts from the position P1 for the maximum reduction ratio, and a moment when the roller 60 reaches the retaining position P2 is short enough to avoid giving an unpleasant feeling to the rider. Therefore, the rider does not feel any unpleasant feeling before engine brake becomes effective.

After the vehicle has reached the bottom of the hill and the traveling mode has changed from the engine-braking mode to the engine-driving mode, each of the rollers 60 retained at the retaining position P2 (FIG. 7) moves out of the recess 61 onto the first working surface 57a and, thereafter, moves along the first working surface 57a in the cam groove 57.

Incidentally, the depth H of the recess 61 and the position of the retaining surface 61a shown in FIG. 7 may be changed in order to set the effectiveness of engine brake at a desired level.

Figure 8:
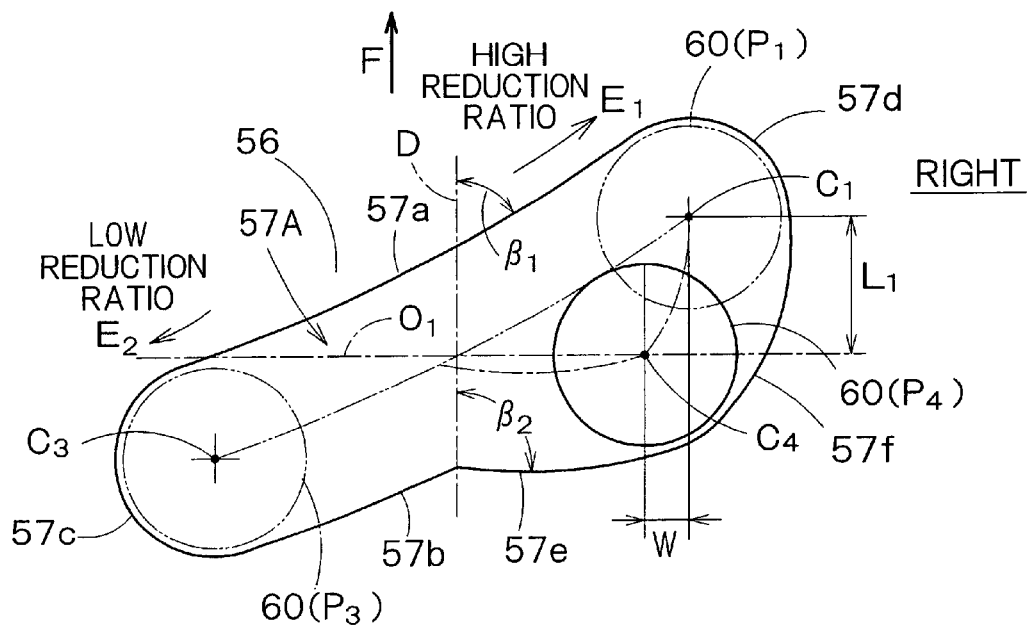
FIG. 8 is an enlarged development of a cam groove formed in a cylindrical cam shaft included in a variable-speed V-belt drive in another embodiment according to the present invention.

A variable-speed V-belt drive in another embodiment will be described hereinafter. The variable-speed V-belt drive in this embodiment is substantially the same in construction as the variable-speed V-belt drive in the former embodiment shown in FIGS. 1 to 7, and differs from the former embodiment only in the shape of the cam groove. FIG. 8 shows a cam groove 57A formed in the cylindrical cam shaft 56 of the variable-speed V-belt drive in the present embodiment, in which parts like or corresponding to those shown in FIG. 7 are denoted by the same reference characters. A first working surface 57a, against which the roller 60 is pressed while the vehicle is traveling in the engine-driving mode, of the cam groove 57A shown in FIG. 8 is the same as that of the cam groove 57 shown in FIG. 7. A second working surface 57b, against which the roller 60 is pressed while the vehicle is traveling in the engine-braking mode, of the cam groove 57A shown in FIG. 8 has a segment 57e extending at a lead angle β2 (β2<90°) greater than the lead angle β1 of the first working surface 57a instead of the retaining surface 61a shown in FIG. 7. Hereinafter, the segment 57e will be referred to as "segment 57e having the large lead angle β2."

The term, "lead angle β" is used in the same sense as the term, "lead angle" that is used in describing screw thread, twist drills and the like. The lead angle β1 of the first working surface 57a is the angle defined by the first working surface 57a and a plane D including a point on the first working surface 57a and normal to the axis $O_1$, of the driven shaft 27, and the lead angle β2 of the segment 57e is the angle defined by the segment 57e and the plane D normal to the axis $O_1$ of the driven shaft 27.

An end on the side of a part for high reduction ratios of the segment 57e having the large lead angle β2 merges smoothly into the guide surface 57f. An end on the side of an end for the high reduction ratios of the guide surface 57f merges smoothly into an end surface 57d on the side for high reduction ratios. The other end on the side of a part for low reduction ratios of the segment 57e joins to the second working surface 57b substantially parallel to the first working surface 47a at a point substantially corresponding to the middle of the cam groove 57A with respect to the length of the cam groove 57A.

A transition position P4 where the roller 60 moves from the guide surface 57f to the segment 57e having the large lead angle β2 is substantially the same as the retaining position P3 shown in FIG. 7. Suppose that the center of the roller 60 is at a point C4 when the roller 60 is at the position P4. Then, the position C4 of the center of the roller 60 is behind the position C1 of the same when the roller 60 is at the position P1 for the maximum reduction ratio with respect to the rotating direction F by a predetermined circumferential distance L1 and is at a predetermined axial distance W from the position C1 toward the other end of the cam groove 57A for the minimum reduction ratio. The predetermined axial distance W is on the order of half the radius R1 of the roller 60, i.e., a distance in the range of about 5 to about 10 mm. The predetermined circumferential distance L1 is determined such that a time lag between a moment when engine brake is employed, i.e., a moment when the roller 60 starts from the position P1 for the maximum reduction ratio, and a moment when engine brake becomes effective, i.e., a moment when the roller 60 reaches the transition position P4, is short enough to avoid giving an unpleasant feeling to the rider. For example, the predetermined circumferential distance L1 is equal to the circumferential length of an arc on the circumference of the cylindrical cam shaft 56 corresponding to a central angle in the range of about 18° to about 21°.

The variable-speed V-belt drive in the present embodiment with the cylindrical cam shaft 56 having the cam grooves 57A shown in FIG. 8 is suitable for traveling in the engine-braking mode down a hill less steep than a very steep hill for which the variable-speed V-belt drive in the former embodiment is suitable for the vehicle to travel in the engine-braking mode.

When the vehicle with the variable-speed V-belt drive in the present embodiment starts traveling forward down a hill with the engine speed maintained at an idling speed, the rollers 60 are at or near the position P1 for the maximum reduction ratio, and the traveling mode changes from the engine-driving mode to the engine-braking mode.

If the hill is a steep, the driving force of the rear wheels 2 is high and the movable sheave 55 of the driven pulley 28 starts moving axially away from the fixed sheave 54. In such a case, each of the rollers 60 located near the position P1 for the maximum reduction ratio (FIG. 8) moves along the guide surface 57f toward a position for a low reduction ratio. Resistance against the movement of roller 60 along the guide surface 57f increases upon the arrival of the roller 60 at the transition position P4 where the guide surface 57f is joined to the segment 57e having the large lead angle β2. Consequently, the further movement of the roller 60 toward the part for lower reduction ratios is suppressed and the desired effect of engine brake can be maintained.

The transition position P4 is at the fixed axial distance W from the position P1 for the maximum reduction ratio toward a position for a low reduction ratio. Therefore, the engine brake becomes effective gradually and shocks that are generated when engine brake becomes effective can be reduced. The circumferential distance L1 is determined such that a time lag between a moment when each roller 60 starts from the position P1 for the maximum reduction ratio and a moment when the roller 60 reaches the transition position P4 is short enough to avoid giving an unpleasant feeling to the rider. Therefore, the rider does not feel any unpleasant feeling before engine brake becomes effective.

Since the roller 60 is not perfectly restrained from movement at the transition position P4, the roller 60 is not locked at the transition position P4 and hence any intense shock will not be given to the rider when engine brake becomes effective.

Figure 9:
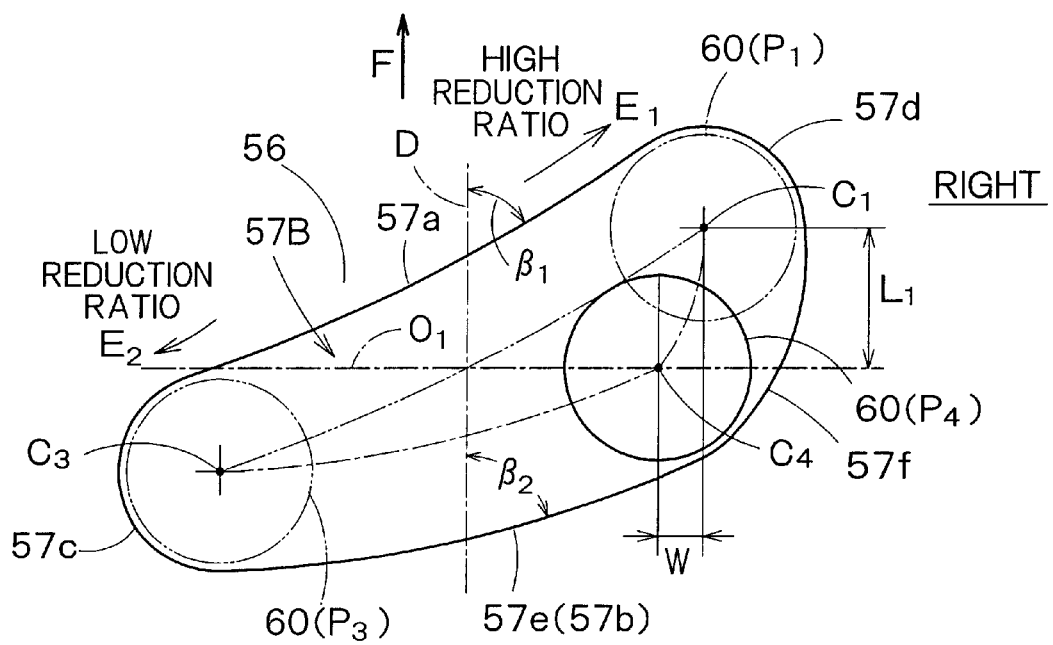
FIG. 9 is an enlarged development of a cam groove formed in a cylindrical cam shaft included in a variable-speed V-belt drive in another embodiment according to the present invention.

A variable-speed V-belt drive in another embodiment according to the present invention will be explained with reference to FIG. 9. This embodiment is a modification of the variable-speed V-belt drive in the former embodiment shown in FIG. 8. The present embodiment is provided with a cylindrical cam shaft 56 having cam grooves 57B shown in FIG. 9. As shown in FIG. 9, the cam groove 57B has a segment 57e having the large lead angle β2 extending to an end surface 57c of a part for low reduction ratios of the cam groove 57B.

Figure 10:
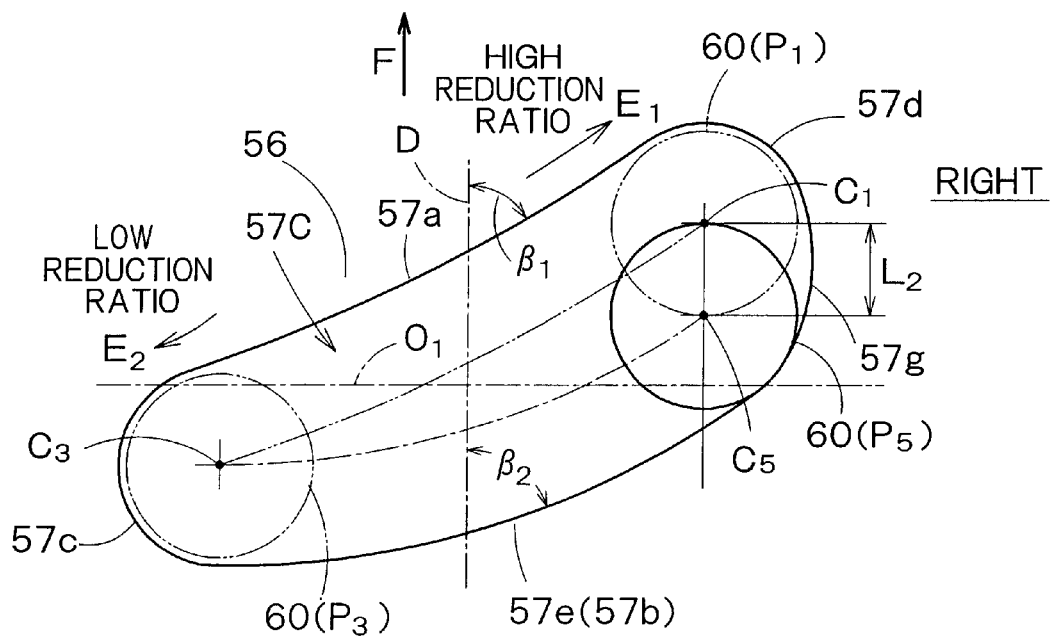
FIG. 10 is an enlarged development of a cam groove formed in a cylindrical cam shaft included in a variable-speed V-belt drive in another embodiment according to the present invention.

A variable-speed V-belt drive in another embodiment according to the present invention will be explained with reference to FIG. 10. This embodiment is substantially the same in construction as the variable-speed V-belt drive in the former embodiment shown in FIGS. 1 to 7, and differs from the former embodiment only in the shape of the cam groove. The present embodiment is provided with a cylindrical cam shaft 56 having cam grooves 57C shown in FIG. 10. As shown in FIG. 10, the cam groove 57C has a first working surface 57a on the front side with respect to the rotating direction F, and a second working surface 57b on the back side with respect to the rotating direction F. When the all-terrain vehicle is traveling in the engine-driving mode, the roller 60 is pressed against the first working surface 57a. When the all-terrain vehicle is traveling in the engine-braking mode, the roller 60 is pressed against the second working surface 57b. The entire second working surface 57b is a segment 57e having the large lead angle β2 larger than the lead angle β1 of the first working surface 57a. A guide surface 57g smoothly merging into the end surface 57d of a part for high reduction ratios guides the roller 60 only for circumferential movement by a fixed circumferential distance L2 in a direction opposite to the rotating direction F and does not guide the roller 60 for axial movement. An end of the guide surface 57g on the side of a part for low reduction ratios merges smoothly into the segment 57e having the large lead angle β2.

The position C5 of the center of the roller 60 when the roller 60 is at a transition position P5 where the roller 60 shifts from the guide surface 57g to the segment 57e having the large lead angle β2 is the same as that of the position C1 of the center of the roller 60 when the roller 60 is at a position P1 for the maximum reduction ratio with respect to an axial direction. Moreover, the position P5 is behind the position P1 by the predetermined circumferential distance L2 with respect to the rotating direction F.

When the torque of the rear wheels increases and the movable sheave 55 of the driven pulley 28 shown in FIG. 3 starts moving away from the fixed sheave 54 when the vehicle travels down a steep hill in the engine-braking mode, each roller 60 at a position near the position P1 for the maximum reduction ratio is forced to move along the guide surface 57g toward the transition position P5. Resistance against the movement of roller 60 along the guide surface 57g increases upon the arrival of the roller 60 at the transition position P5 where the guide surface 57g is joined to the segment 57e having the large lead angle β2. Consequently, the further movement of the roller 60 toward the part for lower reduction ratios is suppressed and the desired effect of engine brake can be maintained.

Since the roller 60 is not locked completely at the transition position P5, engine brake becomes effective gradually.

Although the variable-speed V-belt drives of the aforementioned embodiments are applied to a four-wheeled vehicle, the variable-speed V-belt drive of the present invention is also applicable to a motorcycle.

Figure 11:
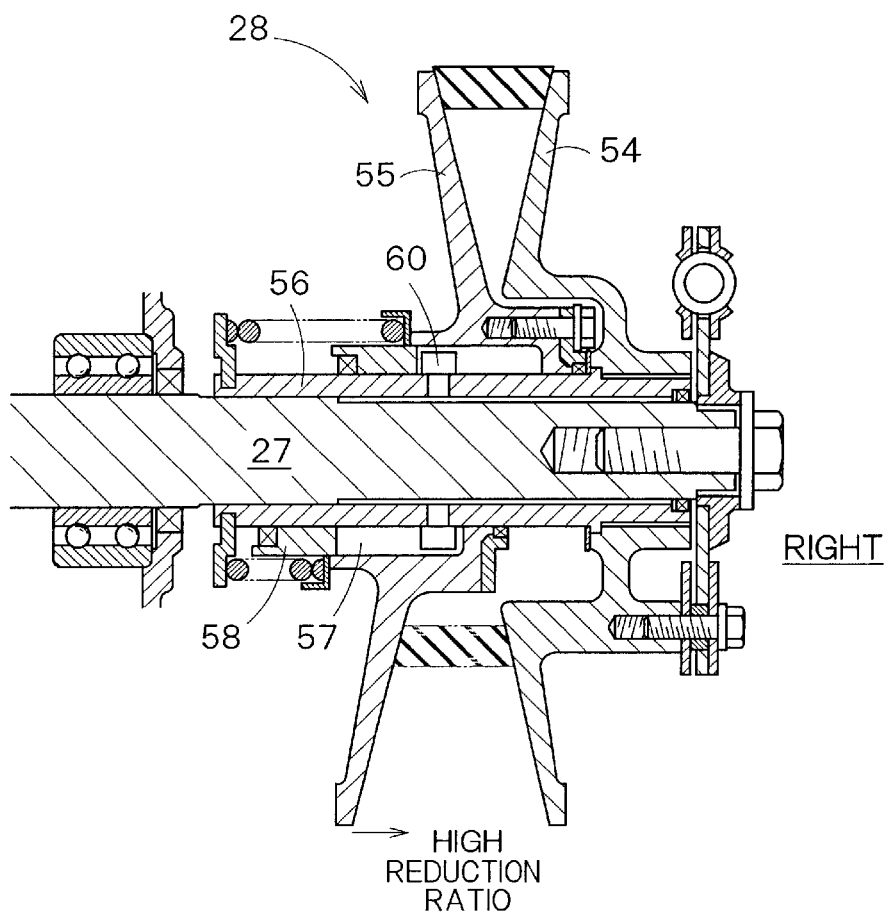
FIG. 11 is a sectional view of a driven pulley included in one modification of the embodiment shown in FIG. 3.
Figure 12:
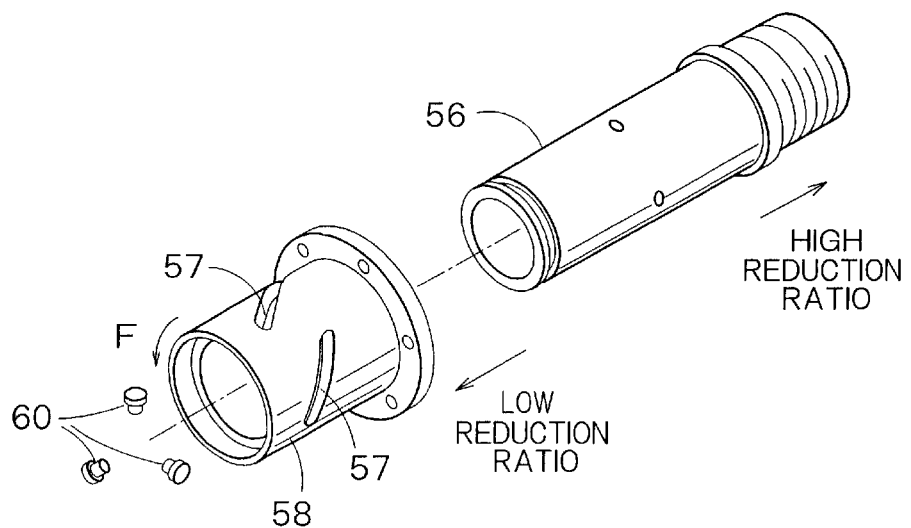
FIG. 12 is an exploded perspective view of a sleeve and a cylindrical shaft included in the driven pulley of the modification shown in FIG. 11.

Although the cam grooves 57 are formed in the cylindrical cam shaft 56 and the rollers 60 are retained on the sleeve 58 in the driven pulley 28 of the variable-speed V-belt drive shown in FIG. 3, as shown in FIGS. 11 an 12, the cam grooves 57 may be formed in the sleeve 58 and the rollers 60 may be retained on the cylindrical shaft 56.

The movable sheave 55 of the driven pulley 28 may be formed integrally with the sleeve 58.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A variable-speed V-belt drive for a vehicle with an engine, comprising:

a drive pulley mounted on a drive shaft;

a thrusting mechanism mounted on the drive shaft and capable of exerting thrust to the drive pulley to vary effective pitch diameter of the drive pulley;

a driven pulley mounted on a driven shaft, the driven pulley including a fixed sheave fixedly mounted on the driven shaft and a movable sheave, the fixed sheave being integrally provided with a cylindrical shaft, the movable sheave being mounted on the cylindrical shaft so that the movable sheave can rotate and axially move on the cylindrical shaft;

a V belt extended between the drive pulley and the driven pulley; and a pressure mechanism of applying pressure to the movable sheave of the driven pulley, the pressure mechanism including a helical cam groove formed in one of the cylindrical shaft and the movable sheave of the driven pulley, and a roller mounted on other of the cylindrical shaft and the movable sheave of the driven pulley so that the roller engages with the cam groove, the cam groove having opposite side surfaces respectively serving as a first working surface with which the roller engages when the vehicle travels in an engine-driving mode in which the driven shaft is driven by the driven pulley and a second working surface with which the roller engages when the vehicle travels in an engine-braking mode in which the driven pulley is driven by the driven shaft, the second working surface of the cam groove having at a predetermined position in an axial direction a retaining surface that restricts movement of the roller toward a low reduction ratio side when the vehicle travels in the engine-braking mode.

2. The variable-speed V-belt drive according to claim 1, wherein the predetermined position is near a position for a maximum reduction ratio.

3. The variable-speed V-belt drive according to claim 2, wherein the second working surface of the cam groove is provided with a recess involving the retaining surface and having a depth equal to about half a diameter of the roller, the recess protruding in a circumferential direction so as to make a width of the groove wider.

4. The variable-speed V-belt drive according to claim 3, wherein the recess involves the retaining surface and a guide surface, the guide surface extending from the retaining surface and smoothly merging into an end surface of the cam groove on a side of the position for the maximum reduction ratio.

5. The variable-speed V-belt drive according to claim 1, wherein the second working surface is provided with a recess involving the retaining surface and having a depth equal to about half a diameter of the roller, the recess protruding in a circumferential direction so as to make a width of the groove wider.

6. The variable-speed V-belt drive according to claim 5, wherein the recess involves the retaining surface and a guide surface, the guide surface extending from the retaining surface and smoothly merging into an end surface of the cam groove on a side of the position for the maximum reduction ratio.

7. A variable-speed V-belt drive for a vehicle with an engine, comprising:

a drive pulley mounted on a drive shaft;

a thrusting mechanism mounted on the drive shaft and capable of exerting thrust to the drive pulley to vary effective pitch diameter of the drive pulley;

a driven pulley mounted on a driven shaft, the driven pulley including a fixed sheave fixedly mounted on the driven shaft and a movable sheave, the fixed sheave being integrally provided with a cylindrical shaft, the movable sheave being mounted on the cylindrical shaft so that the movable sheave can rotate and axially move on the cylindrical shaft;

a V belt extended between the drive pulley and the driven pulley; and a pressure mechanism applies pressure to the movable sheave of the driven pulley, the pressure mechanism including a helical cam groove formed in one of the cylindrical shaft and the movable sheave of the driven pulley, and a roller mounted on other of the cylindrical shaft and the movable sheave of the driven pulley so that the roller engages with the cam groove, the cam groove having opposite side surfaces respectively serving as a first working surface with which the roller engages when the vehicle travels in an engine-driving mode in which the driven shaft is driven by the driven pulley and a second working surface with which the roller engages when the vehicle travels in an engine-braking mode in which the driven pulley is driven by the driven shaft, the second working surface of the cam groove including at a predetermined position in the axial direction a segment having a large lead angle which is larger than a lead angle of the first working surface.

8. The variable-speed V-belt drive according to claim 7, wherein the segment near a position, for a maximum reduction ratio.

9. The variable-speed V-belt drive according to claim 7, wherein the segment extends from a position, which axially coincides with a position for a maximum reduction ratio in the cam groove, toward a position for a low reduction ratio.

* * * * *